United States Patent [19]

Skalski

[11] Patent Number: 5,535,853
[45] Date of Patent: Jul. 16, 1996

[54] ACTUATOR HAVING A TWO ENDED ACTUATOR ROD MOVABLE LONGITUDINALLY AND TRANSVERSELY

[75] Inventor: Clement A. Skalski, Avon, Conn.

[73] Assignee: Otis Elevator Company, Farminton, Conn.

[21] Appl. No.: 339,432

[22] Filed: Nov. 14, 1994

[51] Int. Cl.⁶ ................................................. B66B 7/04
[52] U.S. Cl. ........................... 187/410; 187/394; 187/292; 310/14; 310/51
[58] Field of Search .................................... 187/409, 410, 187/406, 408, 289, 292, 394; 310/14, 51; 318/115

[56] References Cited

U.S. PATENT DOCUMENTS

| | | | |
|---|---|---|---|
| 3,048,818 | 8/1962 | Burckhardt et al. | 187/134 |
| 4,892,328 | 1/1990 | Kurtzman et al. | 280/707 |
| 4,912,343 | 3/1990 | Stuart | 310/14 |
| 4,969,622 | 11/1990 | Stuart | 280/707 |
| 4,998,441 | 3/1991 | Stuart | 73/862.04 |
| 5,033,588 | 7/1991 | Nakai et al. | 187/289 |
| 5,086,882 | 2/1992 | Sugahara et al. | 187/95 |
| 5,099,158 | 3/1992 | Stuart et al. | 310/14 |
| 5,162,767 | 11/1992 | Lee et al. | 335/255 |
| 5,187,398 | 2/1993 | Stuart et al. | 310/14 |
| 5,207,239 | 5/1993 | Schwitalla | 137/115 |
| 5,212,977 | 5/1993 | Stuart | 72/347 |
| 5,222,714 | 6/1993 | Moringo et al. | 251/129.16 |
| 5,231,336 | 7/1993 | van Namen | 310/12 X |

FOREIGN PATENT DOCUMENTS

| | | | |
|---|---|---|---|
| 503972 | 9/1992 | European Pat. Off. | |
| 5116869 | 5/1993 | Japan | 187/410 X |
| 5124783 | 5/1993 | Japan | 187/410 X |
| 5246661 | 9/1993 | Japan | 187/410 X |
| 2262932 | 7/1993 | United Kingdom | 187/410 X |

*Primary Examiner*—William E. Terrell
*Assistant Examiner*—Dean A. Reichard

[57] ABSTRACT

An actuator having a part that is capable of moving both longitudinally and transversely may include a housing having a longitudinal axis with respect to which the movable actuator part can move within the housing both longitudinally and transversely. The actuator may include electromagnetic windings on a central section of the moveable part and permanent ring magnets disposed thereabout within the housing. The housing may be adapted to allow the longitudinal and transverse movement of the movable part to compensate for rotational movement of pivot mounted linkages connected to first and second ends of the movable part.

13 Claims, 8 Drawing Sheets

ACTUATOR HAVING A TWO ENDED ACTUATOR ROD MOVABLE LONGITUDINALLY AND TRANSVERSELY

BACKGROUND OF THE INVENTION

1. Field of the Invention

The present invention generally relates to an actuator and, in particular, relates to one such actuator having a two ended actuator rod movable both longitudinally and transversely.

2. Background of the Invention

As used herein the phrase "two ended actuator rod" and the idiomatic variations thereof is generally taken to mean an actuator rod having both ends thereof available for connection to or contact with linkages, structural members, or the like. Accordingly, the phrase "one ended actuator rod" and the idiomatic variations thereof is generally taken to mean an actuator rod having only a single end available for connection to or contact with a linkage, a structural member, or the like.

Actuators, in general, are well known and readily available on the commercial market in many configurations. Typical of actuators having one ended actuator rods are those described hereinafter.

U.S. Pat. No. 4,912,343 entitled Electromagnetic Actuator and issued on Mar. 27, 1990 describes, inter alia, an angular actuator that exerts a force along a predetermined arc. In that arrangement, the housing and electromagnetic assembly is formed in the shape of the arc through which the actuator arm is to be rotated. Hence, the actuator rod can only move along the predetermined arc. Further, the actuator has only one end of the actuator rod available to be connected to a linkage.

U.S. Pat. No. 5,099,158 entitled Electromagnetic Actuator issued Mar. 24, 1992 describes an actuator wherein angular forces can be exerted through a predetermined arc. As shown therein, in order to accomplish such angular forces the linkage connecting to the control arm must either have a slotted opening so that a first assembly of the actuator can move linearly relative to another to a second assembly of the actuator or have the first assembly be formed in the predetermined arc and have the second assembly ride therealong.

U.S. Pat. No. 4,969,662 entitled Active Damping System For An Automobile Suspension, issued Nov. 13, 1990 describes an active damping system wherein there is one actuator rod associated with each wheel of the vehicle.

U.S. Pat. No. 5,162,767 entitled High Efficiency Solenoid, issued Nov. 10, 1992 describes a solenoid wherein the plunger, or actuator rod, has one end thereof available for connection to a device to be controlled.

U.S. Pat. No. 5,207,239 entitled Variable Gain Servo Assist, issued May 4, 1993 describes a hydraulic actuator. The actuator described is a unilateral device wherein only one end of an actuator rod is available for connection to the device to be controlled.

U.S. Pat. No. 5,222,714 entitled Electromagnetic Actuated Valve issued Jun. 29, 1993 describes an actuator that is designed for high frequency operation. The actuator discussed has a one ended actuator rod.

Further, actuators having two ended actuator rods are also known. For example, in U.S. Pat. No. 5,187,398 entitled Electromagnetic Actuator issued Feb. 6, 1993 an actuator having a rod that can be connected to devices at both ends of the rod is described. The rod can be either unitary or segmented. The rod is maintained in position by openings in the end caps of the actuator and bearings are provided at each end of the casing.

U.S. Pat. No. 5,231,336 entitled Actuator For Active Vibration Control, issued on Jul. 27, 1993, describes a two ended controllable actuator rod. The actuator, as described therein, is used for active vibration control and includes openings that have bearings for maintaining the actuator rod in a linear position. Hence, such an actuator is limited to applying forces that are axially aligned with the actuator rod.

U.S. Pat. No. 5,212,977 entitled Electromagnetic Re-Draw Sleeve Actuator, issued May 25, 1993, also describes an actuator wherein the force exerted by the actuator rod is coaxial with the coil of the magnet.

U.S. Pat. No. 4,892,328 entitled Electromagnetic Strut Assembly issued Jan. 9, 1990 describes an assembly for use in an active suspension system for controlling the orientation of the chassis of a motor vehicle relative to the frame of the vehicle. Therein, each wheel of the vehicle is provided with an actuator that is aligned with the strut associated with the wheel of the vehicle it is to control.

U.S. Pat. No. 4,998,441 entitled Force And Torque Measurement System, issued on Mar. 12, 1991 describes a system for measuring forces applied to a mass. The system described includes an apparatus for suspending a mass and includes actuators for responding to forces generated and for generating signals in response thereto.

Many of the actuators discussed and described in the above patents typically find application in the general field of automobile vibration dampening systems wherein each wheel of the automobile is provided with an actuator controlled dampening apparatus for independent suspension systems. However, there is another, significantly different, field wherein actuators, in general, have been used for controlling, or damping, vibrations. Specifically, actuators are useful in reducing the vibrations of elevator cars.

As well known, elevators are installed to ride along guide rails within an elevator shaft. During installation, the guide rails are usually installed in sections that are bolted together. These rails, particularly in tall buildings, can only be installed sufficiently straight at considerable cost. The rails' alignment deteriorates with time, particularly in newly constructed buildings. Rail misalignment tends to appear as a periodic bending related to floor spacing. As a result of such bends, the elevator riding along the bent rails on rollers is caused to vibrate when the bends are encountered by the rollers. Hence, the ride may be uncomfortable for passengers using the elevators.

As shown in U.S. Pat. No. 5,322,144 and related patents of assignee hereof, to reduce such vibrations active control may be used, typically utilizing accelerometer feedback. Such a system detects horizontal vibration of the elevator car and provides a control signal to a compensating mechanism to exert forces between the car and rail to reduce the vibrations. As shown at 44 and 50 of the Figures of European patent application publication 0467673A2, at 22 of the Figures of U.S. Pat. No. 5,294,757 and in U.S. Pat. No. 5,086,882, for example, an actuator is installed proximate each guide wheel and exerts a force thereagainst in response to a signal from a sensor.

Another approach to reducing, or damping, vibrations caused by irregularities in the guide rails is disclosed and discussed in U.S. patent application Ser. Nos. 668,544 and 668,546 both filed on Mar. 13, 1991 and assigned to the assignee hereof (see EPO Publication 0503972A2 corresponding thereto). Therein, the general approach to compensating for vibrations caused by irregularities along the guide mils includes the determination of the rail profile during a rail learning run of the car in the hoistway. This information is then used to control the rollers when the elevator is in service. As shown therein actuators are used to control the movement of springs that interconnect with the rollers.

Consequently, although some conventional actuators move angularly or can be linked to rotatable arms via a pivot arrangement, none of these actuators allow a longitudinally slidable actuator rod to independently move in the transverse direction such that a rotatable lever, or linkage, having a fixed pivot point can be rigidly affixed to each end of the actuator rod.

DISCLOSURE OF THE INVENTION

Accordingly, it is one object of the present invention to provide an actuator that overcomes the above-discussed deficiencies of conventional actuators.

This object is accomplished, at least in part, by an actuator having a magnetically controlled longitudinally slidable actuator rod and means associated with the actuator housing for allowing the longitudinal slidable actuator rod to move transversely.

In one aspect of the invention the actuator rod is adapted to move transversely within the housing, i.e., without bearings, to compensate for inherent rotation caused by the end sections of the actuator rod being connected to pivoting linkages. In another aspect of the invention the actuator rod is mounted on bearings within the housing but the housing is adapted to be bias mounted such that the inherent rotation caused by the pivoting of the linkages connected to the end sections of the actuator rod is compensated for by movement of the housing. The housings may take various shapes such as, but not limited to, cylindrical, planar, rectangular, etc.

Other objects and advantages of the present invention will become apparent to those skilled in the art from the following detailed description of the preferred embodiment read in conjunction with the appended claims and the drawing attached hereto.

BRIEF DESCRIPTION OF THE DRAWING

The drawings, not drawn to scale, include.

BEST MODE FOR CARRYING OUT THE INVENTION

Figures 1A, 1B, 1C:
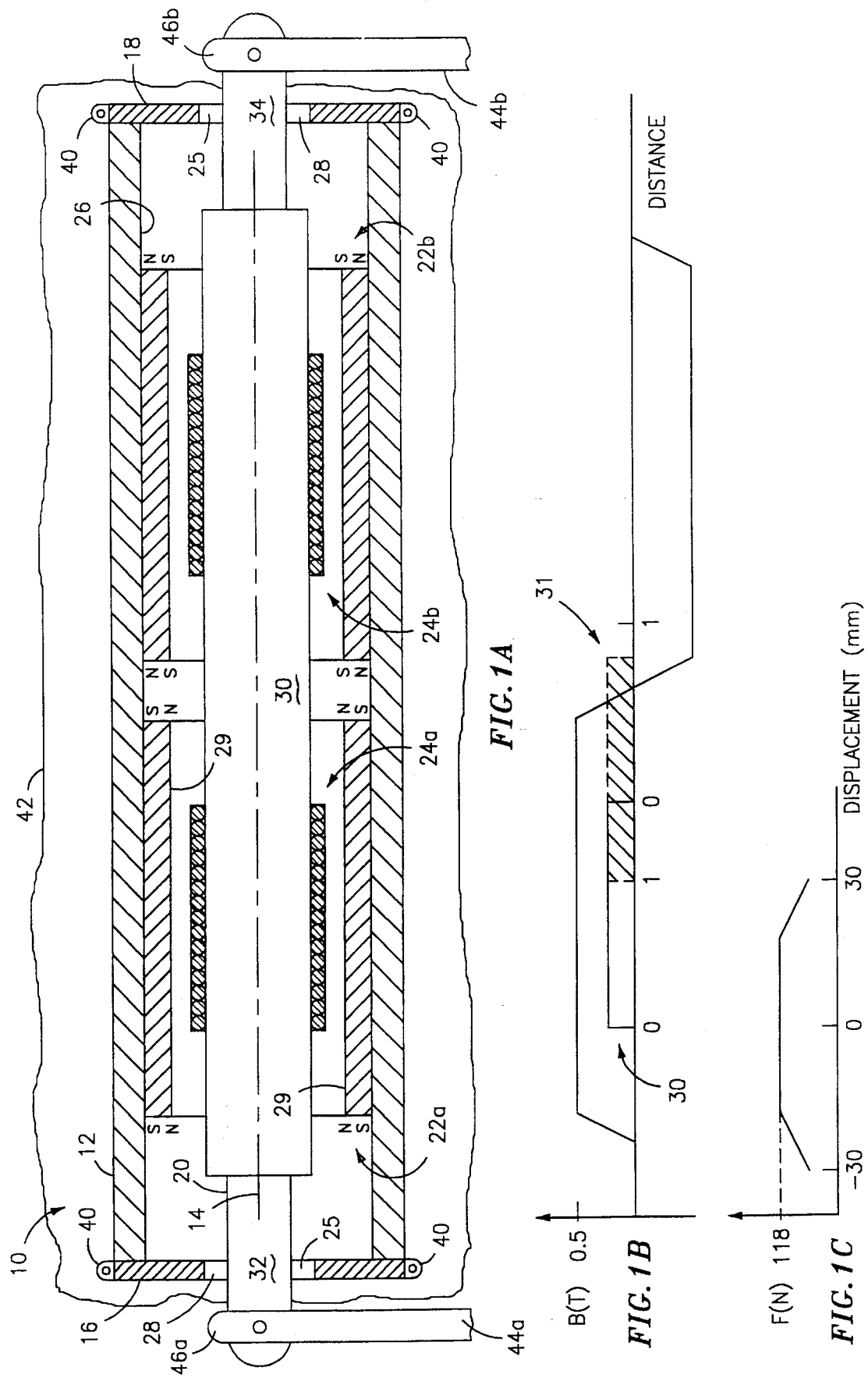
FIG. 1A which is a cross-sectional view of an actuator embodying the principles of the present invention.
FIG. 1B should be viewed in conjunction with FIG. 1A with which it is aligned and illustrates magnetic flux density in the gap between the windings of the armature of FIG. 1A and the magnets and also illustrates a 30 millimeter displacement of the armature which may be best understood in conjunction with FIG. 1C.
FIG. 1C should be viewed in conjunction with FIGS. 1A and 1B for illustrating the force that the actuator of FIG. 1A is capable of exerting within its positional range of approximately plus or minus 30 millimeters displacement.

An actuator, generally indicated at 10 in FIG. 1A and embodying the principles of the present invention, includes a housing 12 having a longitudinal axis 14 and first and second ends, 16 and 18, respectively, a slidable actuator rod 20 disposed within the housing 12 and extending beyond said first and second ends, 16 and 18, respectively. Radially poled cylindrical magnets 22a, 22b are disposed within the housing 12 and about the slidable actuator rod 20, for providing radial magnetic fields in the gap between the rod 20 and the inner surface of the magnets. Note that the magnets 22a, 22b are oppositely poled so as to create oppositely directed magnetic flux lines in two separate sections defined by the discrete magnets 22a, 22b. Discrete pans 24a, 24b of a winding may be wound in opposite directions on an armature 30 of the rod 20, as shown, with current lines in the coil part 24a perpendicularly cutting flux lines from magnet 22a in such a way as to cause a force in one direction along the axis 14 while the current lines in the coil part 24b cut oppositely directed flux lines from the magnet 22b in an opposite manner so as to cause a force in the same direction along the axis 14. A current reversal will cause the flux lines to be cut oppositely, causing a force from both sections in the opposite direction along the axis 14. The reason for reversing the flux in the magnets and for winding the coils oppositely is for creating a periodic structure. This makes possible more force than would otherwise be possible for given cross-sectional dimensions. As will be explained further below, there are means 25 associated with the housing 12 at each end 16, 18, for allowing independent transverse motion of the slidable actuator rod 20 within the housing.

In the embodiment of FIG. 1A, the housing 12 is formed with a circular cross-section, i.e., having a cylindrical form on the inside surface 26. In this embodiment, the first and second ends, 16 and 18, of the housing 12 are provided with slots 28 as the above-mentioned means 25. The slots are transverse to the longitudinal axis 14 of the housing 12. As more fully discussed hereinafter the slots 28 allow the slidable actuator rod 20 to move in a direction transverse to the longitudinal axis 14 of the housing 12.

In this embodiment, the slidable actuator rod 20 includes a central armature section 30 having a comparatively larger diameter and first and second end sections, 32 and 34, respectively, having comparatively smaller diameters. The ends 32, 34 pass through the slots 28 and are not mounted within bearings, i.e., they are free to move transversely within the slots. As mentioned above, the central section 30, or armature, may be provided with a winding in two or more adjacent sections 24a, 24b. The winding sections 24a, 24b are wound on the central section 30 such that when a voltage is applied to the winding current flows in opposite directions in the adjacent sections whereby the flux lines from the oppositely poled magnets are cut in such a way as to create a force in both sections in the same direction along the axis 14. It should be understood that this can be accomplished by either providing a single coil having a plurality of oppositely wound series-connected sections powered from the same source, as shown, or alternatively, by providing a plurality of discrete coils wound in the same direction and controlled separately. Although either arrangement can be readily implemented, the former arrangement is preferred since the number of connections to the coil winding sections 24a, 24b would be minimized.

The plural magnets and associated coils together can be viewed as a periodic structure or means for magnetically controlling the longitudinal movement of the slidable actuator rod 20. As mentioned, it may include a plurality of permanent ring magnets 22a, 22b that may be radially poled, toroidally-shaped magnets, which are commercially available. The radially poled ring magnet 22a, for example, establishes magnetic flux which may be viewed as emerging from an inner surface 29 (which is shown as being a north pole), crossing the air gap between the magnet and the armature 30, entering the armature, passing through the armature in the direction of an end of the magnet, exiting the armature and returning to the outer surface of the magnet by way of a space at an end of the magnet.

The above-mentioned periodic magnetic structure substantially corresponding to that of the oppositely wound winding sections disposed on the central section 30 of the slidable actuator rod 20 is established by alternating the polarity of the magnets along the longitudinal axis 14 of the housing 12. The ring magnets 22a, 22b in the embodiment of FIG. 1, are affixed within the housing 12. It should be realized that multiple magnet sections may be used to make up each magnet 22a, 22b. The winding sections 24a, 24b on the slidable actuator rod 20, or armature, together with the corresponding periodic structure of the ring magnets 22a, 22b form an extension of a conventional voice coil actuator made possible by use of a periodic structure. The disclosed structure makes possible a longer stroke and increased force compared to conventional voice coil actuators. As shown in the embodiment of FIG. 1A, the radial coil thickness may be 3 mm, and the magnet radial length 6 mm.

FIG. 1B should be viewed in conjunction with FIG. 1A as it has its abscissa in units of distance corresponding to the length of the housing 12 of FIG. 1A. It shows the magnetic flux density in the air gaps between the slide rod central section 30 and the plural magnets 22a, 22b. It also shows an example of displacement as further illustrated in FIG. 1C.

For the tubular design of FIG. 1A using radially-poled ring magnets with a steel or iron body 12 having an inside dimension of fifty millimeters, using a pole pitch of one hundred millimeters, with a steel or iron armature and an overall length of the housing of two hundred and fifty millimeters, the working range would be about plus or minus thirty millimeter as shown in FIG. 1C. With magnetic flux density of approximately 0.5 Tesla and a current density of approximately 10 A/mm and a coil volume of approximately 23.6 cc, the maximum force is estimated to be about one hundred and eighteen Newtons within the range shown in FIG. 1C trailing off to a lower level at the maximum estimated displacement of plus or minus thirty millimeter. Such a maximum coil position shift is illustrated in FIG. 1B with a centered coil position 30 illustrated in a corresponding position to that shown in FIG. 1A juxtaposed with a shifted position 31 (with hatching) corresponding to the maximum estimated thirty millimeter displacement of FIG. 1C.

It is estimated that the above-described actuator is capable of generating the above mentioned one hundred and eighteen Newtons for several minutes and two or three times this for a few seconds. It should be realized that it is possible to interchange the lengths of the coils and magnets to produce a design having force characteristics comparable to the above-described design. The advantage of a short magnet design would be to minimize magnet material. The two ring magnets may be barium ferrite which is very inexpensive and which would together have a mass of about 0.8 kg, i.e., 0.4 kg each. This causes maximum force to be approximately fifty Newton. Ring magnets of the above-described type are widely used in automotive equipment in the form of semicircular sections. If high-performance neodymium iron boron magnetic material is used, on the other hand, it is possible to obtain one hundred and forty-two Newtons using a total mass of only about 1.3 kg. Use of this latter material would thus permit reducing the size of the actuator as well.

In the embodiment shown in FIG. 1A, the means 25 associated with the housing 12 for allowing transverse motion includes means 40 for rigidly mounting the housing 12 to a structural member 42. Such mounting means 40 can be any conventional mounting methods or technique available. For example, as shown in FIG. 1, the housing 12 can be mounted to the structural member 42 by a plurality of brackets, screws, bolts or the like.

Figure 2A:
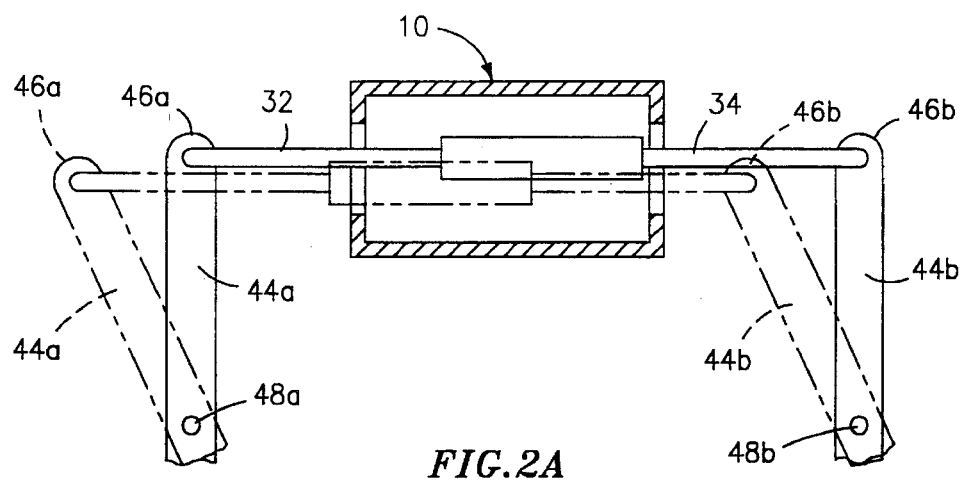
FIG. 2A is a sectional view of an actuator embodying the principles of the present invention connected to linkages and which has an armature capable of moving transversely within the housing itself.

In the operation of this embodiment, longitudinal movement of the slidable actuator rod 20 along the axis 14 or an axis parallel thereto is controlled by the magnitude and direction of the current passing through the winding sections 24a, 24b on the armature. According to an important teaching of the present invention, a motion of the rod 20 transverse to the axis 14 is permitted by the means 25, which in the embodiment shown in FIG. 1 is a slot 28 along with the rigid attachment of the housing 12 to the member 42. I.e., in a case where the housing 12 is rigidly affixed to a structural member 42, a pair of linkages 44a, 44b to which the first and second end sections, 32 and 34, respectively, of the slidable actuator rod 20 are attached, may move the rod 20 transversely to the axis 14. An illustration is shown in FIG. 2A, wherein each of the first and second end sections, 32, 34, of the slidable actuator rod 20 is connected to a movable end 46a, 46b of a corresponding linkage 44a, 44b having a fixed pivot point 48a, 48b. Thus, when a longitudinal force is exerted by movement of the actuator rod 20 upon the movable end 46a of one of the linkages 44a a corresponding longitudinal force, equal in magnitude but opposite in direction, is exerted on the other linkage 44b. Because each of the linkages 44a, 44b have fixed pivot points 48a, 48b when the slidable actuator rod 20 is moved longitudinally, a transverse force is inherently exerted upon the slidable actuator rod 20 at each of the first and second end sections, 32 and 34, thereof. Typically, such a transverse force would result in jamming the actuator rod of conventional actuators and could not be used in this way. However, because the slots 28 are provided in the first and second ends, 16 and 18, of the housing 12, the end sections, 32 and 34, of the slidable actuator rod 20 will be able to move transversely. In effect, the pivot points 48a, 48b and linkages 44a, 44b serve as the "missing" beatings in the slots of the housing. In the embodiment of FIG. 1, the actuator 10 is mounted for allowing independent transverse motion of the slidable actuator rod 20, such that when no current is flowing through the coil on the actuator rod 20 it is transversely centered in the slots 28. As explained below in connection with FIG. 2B, with a gap of about 3 mm on either side of the coil, the cylindrical design has a radial float of about ±3 mm.

For the cylindrical actuator of FIG. 1A with a length on the order of two hundred and fifty millimeters and an inner diameter of fifty millimeters, the estimation given above is that it is capable of generating one hundred eighteen Newtons for several minutes and perhaps two or three times this for a few seconds. For the arrangement of FIG. 1A with the actuator 10 used only for vibration suppression, i.e., with a separate elevator car centering actuator and controller, the peak force required at the rollers should not exceed two hundred and forty Newtons. The distance between the pivot point 48b and the point of attachment to the rod 34 is about one hundred fifty millimeters. The distance between the pivot point 48b and a roller axle (shown in FIG. 7 as a point 144b) is about fifty millimeters. The actuator 10 thus works in a leveraged arrangement of 3:1. Thus, a roller force of two hundred and forty Newtons and stroke of, for example, ±ten millimeters, translates to a force of eighty Newtons at the actuator and a stroke of ±thirty millimeters. As discussed previously, the cylindrical design has a radial float of ±three millimeters, making it suitable, for example, to replace the tie rod 100 of FIG. 6 of the prior art, to be described below. Thus, the armature of the actuator replaces the tie rod. The body of the actuator is of course fixed to the car frame as discussed previously and as described below in FIG. 7 by circles at the corners of the actuator 10 to indicate that the actuator body is tied down to the elevator car.

Figure 2B:
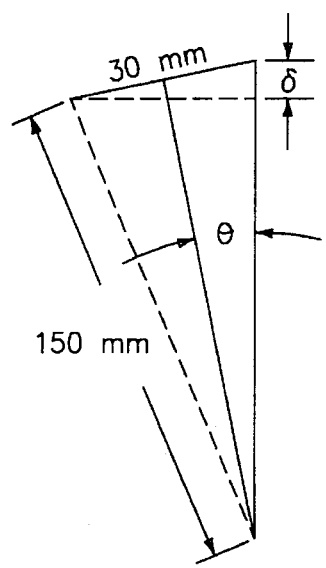
FIG. 2B illustrates a geometrical calculation for determining transverse float within the actuator of FIG. 1 as shown in FIG. 2A.

Given the stroke of thirty millimeters and rocker arm lengths of one hundred and fifty millimeters, the transverse motion (δ) is computed as follows:

δ=30 sin (5.71 °)≅3 mm. The geometry for the above computation is shown in FIG. 2B for the actuator of FIG. 1A.

Figure 3:
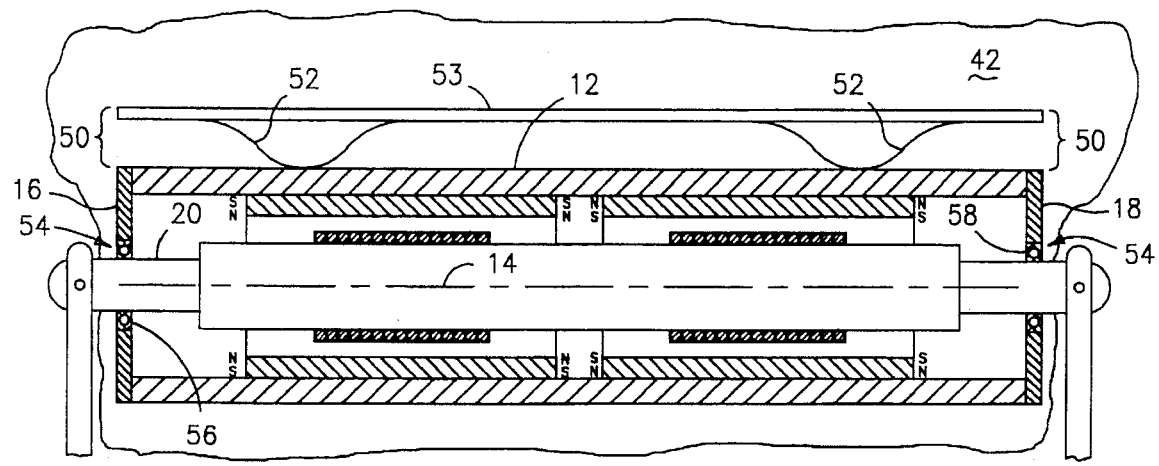
FIG. 3 which is a cross-sectional view of another actuator also embodying the principles of the present invention.

In an embodiment of the present invention shown in FIG. 3, elements that have been previously described are identified by the same reference numerals; in this case, the means 25 associated with the housing 12 for allowing transverse motion includes means 50 for bias mounting the housing 12 itself to the structural member 42. One such means 50 for bias mounting the housing 12 to the structural member 42 includes providing a plurality of leaf springs 52 and using them for bias mounting the housing 12 with respect to a stationary plate 53 rigidly attached to the member 42. It will be understood that many other types of bias mounting means 50 are known in the art and any one or more of such types can also be used to provide the bias mounting means 50. In this embodiment, the first and second ends, 16 and 18, of the housing 12 include circular openings 54 therethrough and the slidable actuator rod 20 is mounted within the circular openings 54 via first and second bearings, 56 and 58, respectively, that allow the slidable actuator rod 20 to only move longitudinally within the housing 12 along the axis 14. The transverse motion of the slidable actuator rod 20, in this embodiment, is introduced by the means 50 for bias mounting the housing 12. Hence, in this embodiment, although the slidable actuator rod 20 does not move in the transverse direction with respect to the housing 12, the slidable actuator rod 20 exhibits transverse movement with respect to the structural member 42 via the means 50 for bias mounting the housing 12.

Figure 4:
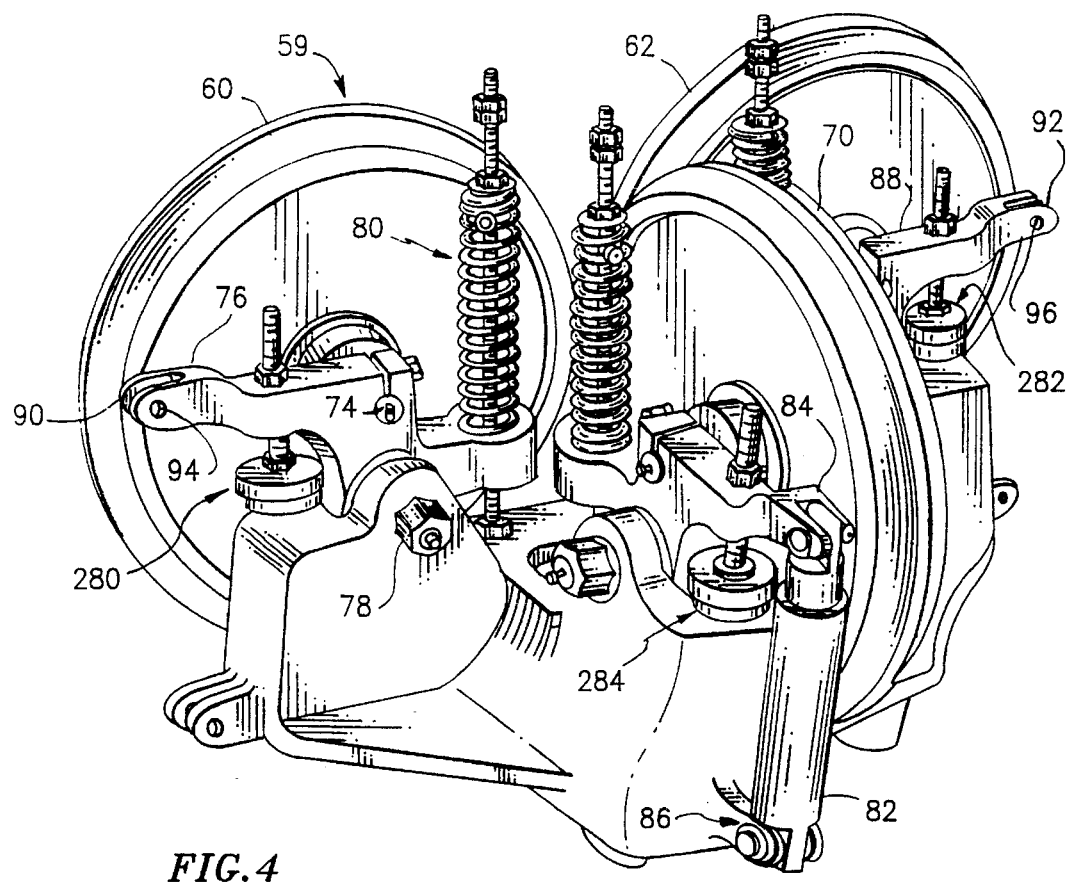
FIG. 4 shows a prior art passive roller guide for placement at each of the corners of an elevator for guiding the elevator car vertically in the hoistway along a pair of opposed hoistway rails on either side of the car.
Figure 5:
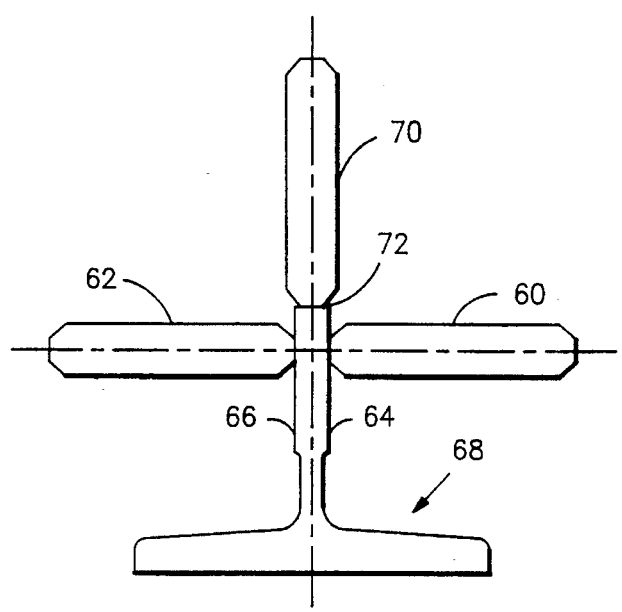
FIG. 5 shows a hoistway rail with the roller guide rollers of FIG. 4 engaged therewith, according to the prior art.

The invention may find particular uses in various industries and one particular application will be shown with respect to elevators. As known in the art of guiding elevators vertically along hoistway rails, roller guides such as shown in FIG. 4 are mounted at the corners of the elevator car for engaging the vertical hoistway rails as shown in section in FIG. 5. FIG. 4 shows a 10 inch (25.4 centimeters) Otis Elevator Company roller guide 59 which may be found installed on numerous high-speed elevators throughout the world. The guide is fixably mounted on the car and front and back rollers 60, 62 roll on opposite faces 64, 66, respectively, of the hoistway rail 68, as shown in FIG. 5. The side-to-side roller 70 rolls on a distal face 72 of the rail 68.

The front-to-back roller 60 has its axle fixedly attached at a point 74 to a rocker arm 76 which rotates about a point 78. An adjustable spring 80 preloads the roller 60 to exert a selected force against rail face 6,1. Rollers 62, 70 are set up similarly to roll on faces 66, 72, respectively. A side-to-side dashpot 82 is shown connected between an arm 84 and a bracket 86. The original design of the roller guide as shown in FIG. 4 made similar provision for front-to-back dashpot for the arm 76 and an arm 88 but the dashpots, at least for some cases, were apparently later found to be unnecessary and are not shown. Consequently, at least some later versions were manufactured without openings and holes for the dashpot 82 as well as without the openings 90, 92 and the holes 94, 96.

Figure 6:
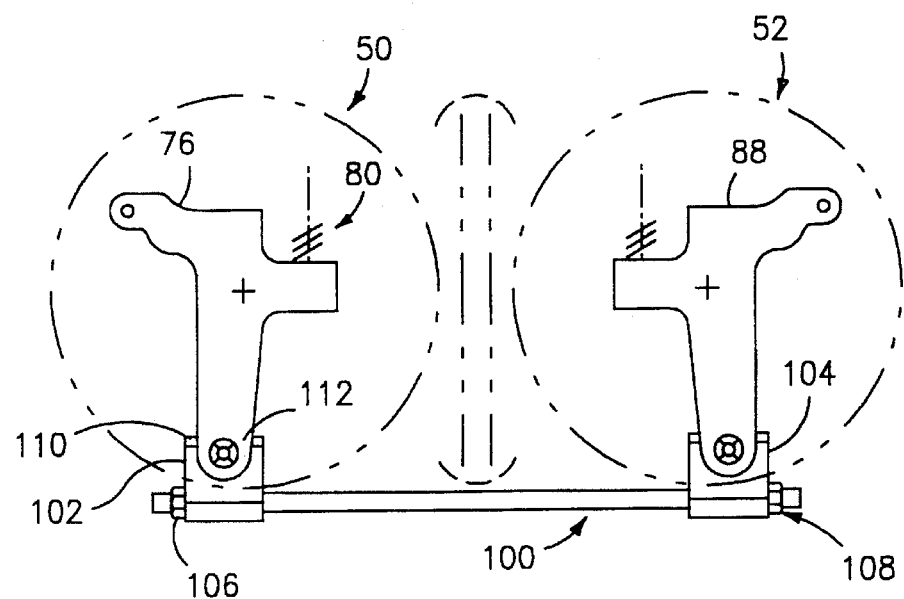
FIG. 6 shows the front-to-back rollers of FIG. 4 and 5 from a different perspective in order to illustrate a tie rod that can be used to connect their associated linkages.

In a schematic view from the other side of the roller cluster of FIG. 4, FIG. 6 shows a tie rod 100, Otis Part Number 96BY1, connected to the bottom of the rocker arm 76, 88 by means of a pair of sleeves 102, 104, Otis Part Number 130HLI, with a ⅜ inch (0.95 centimeter) nut 106, 108 at each end. The sleeves could be attached by means of a bolt 110 and C-clamp 112 combination, Otis Part Numbers 172DRA and 177JP8. This arrangement allows the prior an passive roller guide of FIGS. 4–6 to be adjustably coupled by means of the tie rod 100 which can be made shorter or longer to suit a desired level of preload shared between the two wheels on either side of the rail 68.

An active roller guide has been disclosed in U.S. Pat. No. 5,304,751 in FIGS. 12–17 thereof. The active roller guide of that patent uses various actuators in conjunction with springs to better control horizontal centering and horizontal vibration of the car as it moves vertically in the hoistway. It uses the relatively large actuator for handling low frequency forces such as those caused by uneven passenger distribution and other direct car forces using a position control loop. A loop within the position control loop can be added to the position control to restore a centering actuator to a selected preload position when an opposite actuator is active, i.e., when it is not being used to center the car. Additionally, a relatively small force magnetic actuator is used for handling higher frequency dynamic forces. The specification and Figures of that patent are hereby incorporated by reference in its entirety.

Figure 7:
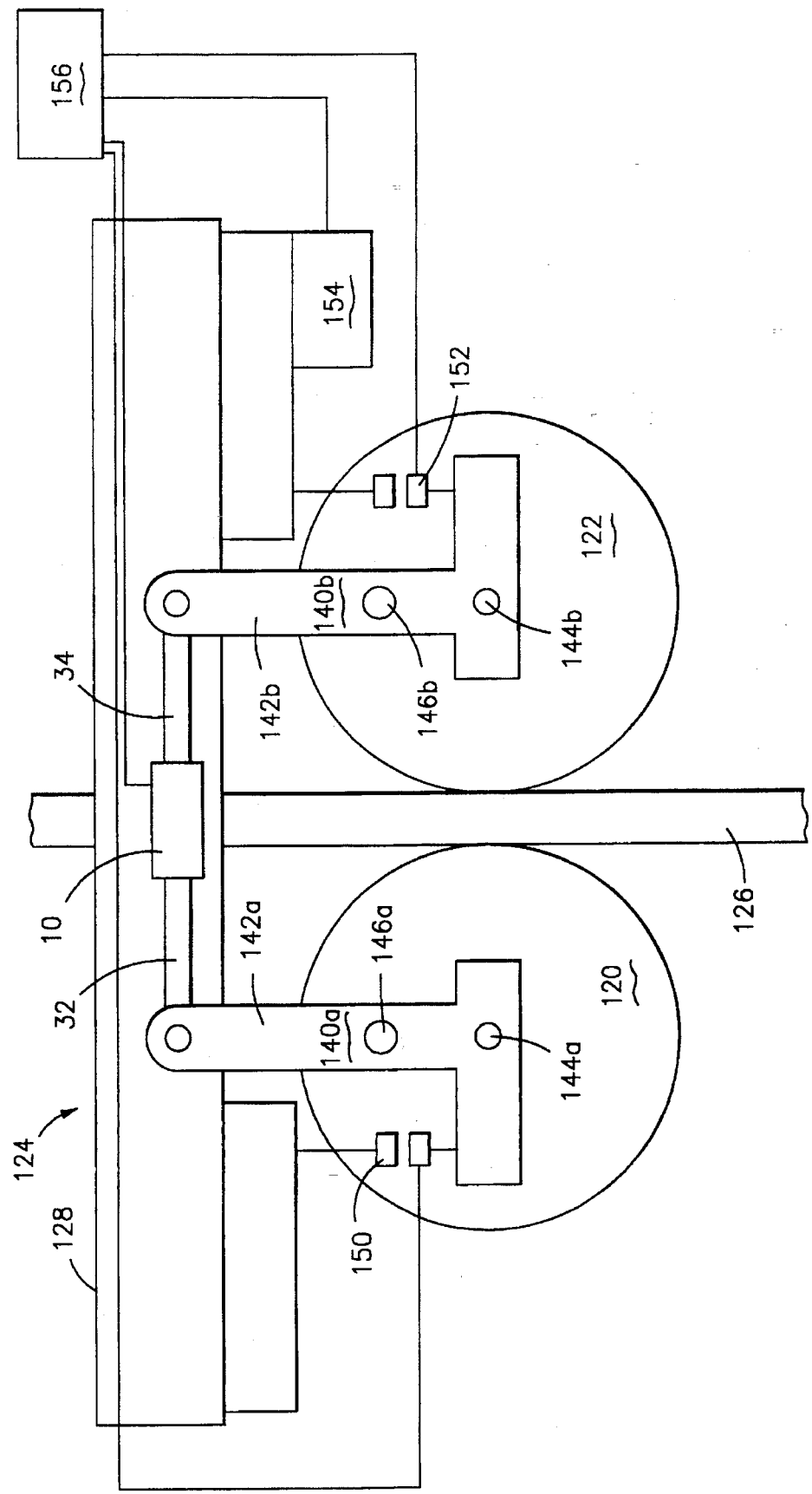
FIG. 7 is a side view of a system, including an actuator embodying the principles of the present invention, for damping front-to-back vibrations of an elevator car.
Figure 8:
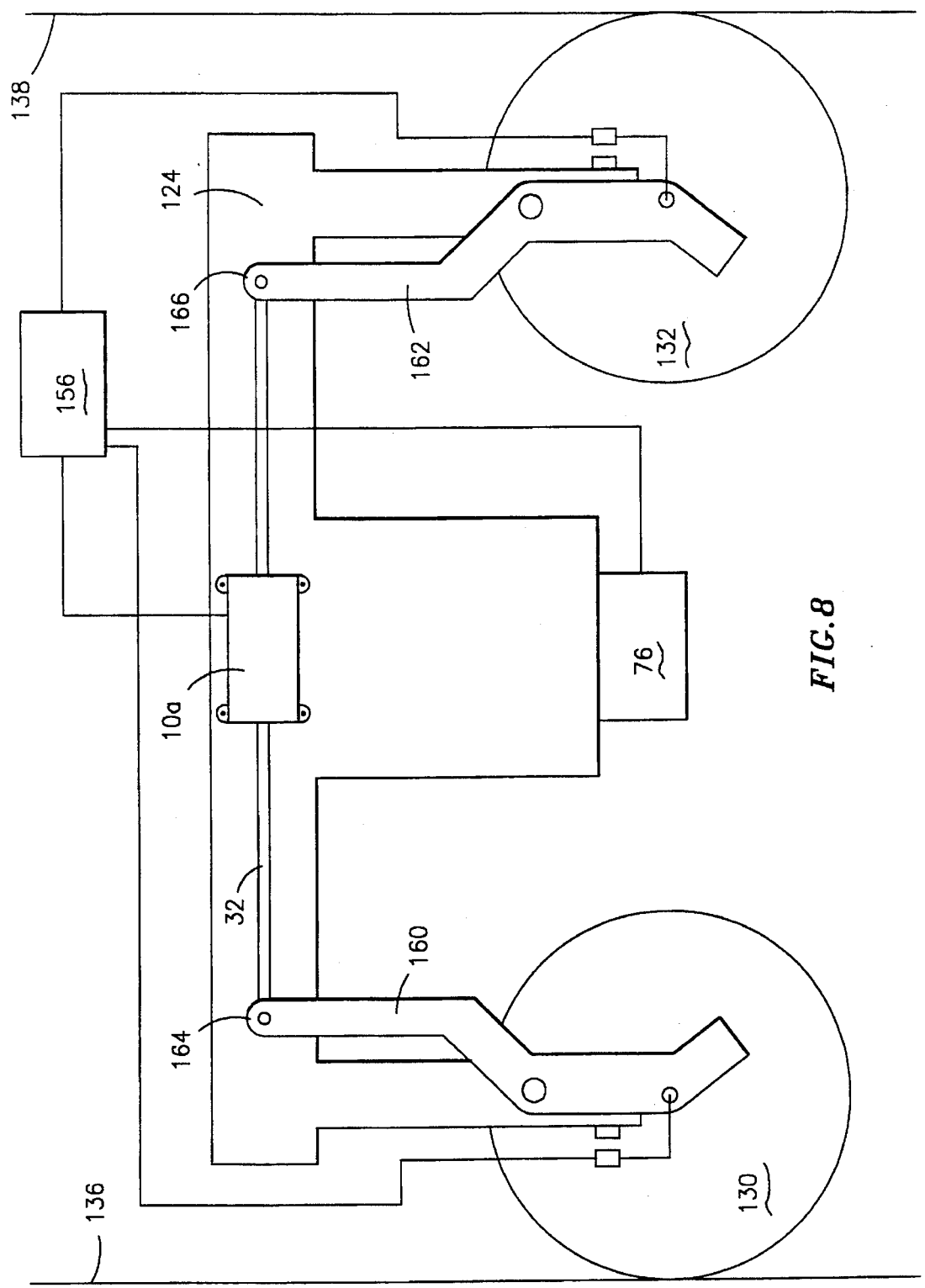
FIG. 8 is a side view of a system, also including an actuator embodying the principles of the present invention, for damping side-to-side vibrations of an elevator car.

In an elevator embodiment using the approach of FIG. 1, the actuator 10 is connected as shown in FIG. 7 as an actuable link, similar to the link 100 of FIG. 6, between a pair of front-to-back rollers 120, 122 of an active roller guide 124. As shown schematically in FIG. 7, the active roller guide 124 has the rollers 120, 122 disposed on opposite sides of a guide rail 126. The guide rail 126 extends vertically within the hoistway of an elevator shaft. The active roller guide forms a cluster of three rollers including the rollers 120, 122 that use another actuator (not shown) to center the car in the front-to-back direction and the actuator 10 of FIG. 7 to reduce front-to-back vibrations, and including a side-to-side roller 130 as shown in FIG. 8, for example, for similarly centering the car (with another not shown actuator) and for reducing vibrations in the side to side direction with the actuator 10a of FIG. 8 in conjunction with a similar roller 132 in a roller guide cluster on the opposite side of the car. The rollers, 130, 132 of FIG. 8 are mounted on opposite sides of the car for rolling on separate rails, 136, 138 on opposite sides of the hoistway.

Referring again to FIG. 7, each roller, 120 and 122, of the roller guide 124 includes, in this embodiment, a rocker arm 140a, 140b connected thereto. Each rocker arm 140a, 140b has a control arm 142a, 142b schematically extending parallel with the guide rail 126 between an associated axis 144a, 144b of the roller, 120 or 122, and the actuator rod 20 (see FIG. 1). As shown, each of the control arms 142a, 142b is rotatably affixed to a pivot point 146a, 146b similar to the point 78 of FIG. 4. The pivot points 146a, 146b are disposed between the axes 144a, 144b of the rollers, 120, 122, and the end sections, 32, 34 (see FIG. 1) of the actuator rod 20. There are of course brackets (not shown) or other means for fixedly attaching the pivot points 146a, 146b to the elevator car 128. Hence, a selected roller, 120 or 122, can be urged against the guide rail 126 as needed to reduce vibrations within the elevator car 128. Typically, such a system includes one or more position sensors 150, 152 for centering and one or more accelerometers 154 for vibration suppression. The position sensors and accelerometers provide an elevator control system 156 with sensed signals that are used to regulate the vibration suppressing actuator 10 and larger actuators (not shown) for centering the car. That is, the amount and the direction of movement of the actuator rod 20 is regulated by the elevator system control 156 in response to the amount of vibration sensed by the accelerometer(s).

In the elevator embodiment shown in FIG. 8, side-to-side centering and/or vibration control is accomplished using the rollers, 130 and 132 that ride along guide rails 136, 138 disposed on opposite sides of the elevator car 124. In this schematic illustration, each roller, 130 and 132, is provided with a pivotable rocker arm 160, 162. One end 164, 166 of each pivotable arm is connected to one end section, 32, 34, of the actuator rod 20 (see FIG. 1). In such an arrangement, the rollers, 130 and 132, can be used to control vibration such that, in response to control signals from the elevator control system 156, when one of the guide wheels, 130 or 132, is urged against the guide rail 136, 138 associated therewith, the other guide wheel, 132 or 130, respectively, is urged away from its associated guide rail 136, 138. Thus, the side-to-side vibrations of the elevator car 124 can be controlled using the actuator of the present invention.

Figure 9B:
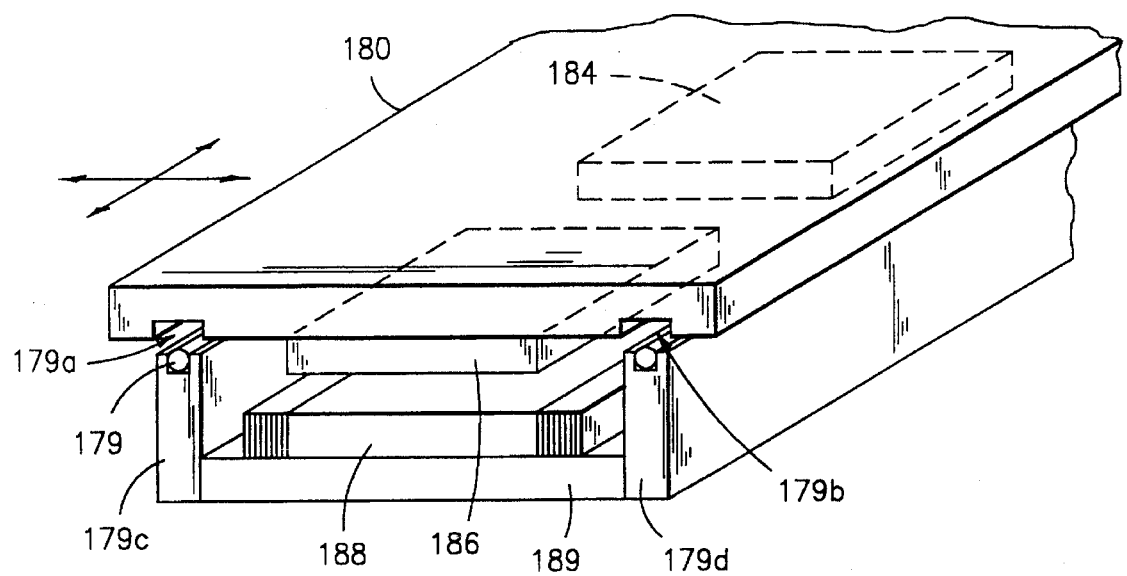
FIG. 9B shows the planar embodiment of FIG. 9A as a two-plate embodiment.
Figure 9C:
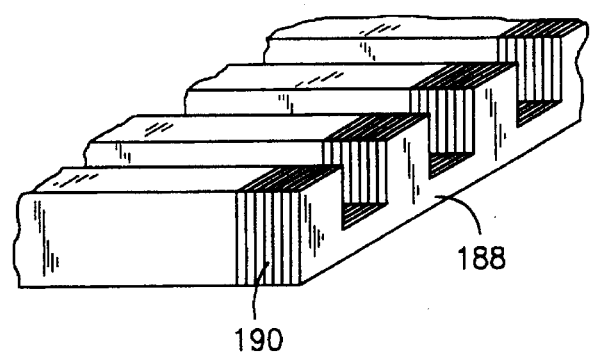
FIG. 9C shows the laminations of the core of FIG. 9A in more detail.
Figure 9D:
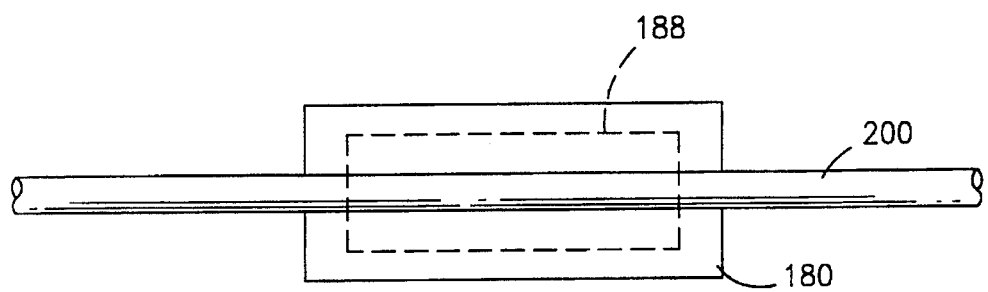
FIG. 9D shows a top view of the planar embodiment of FIG. 9B.
Figure 9A:
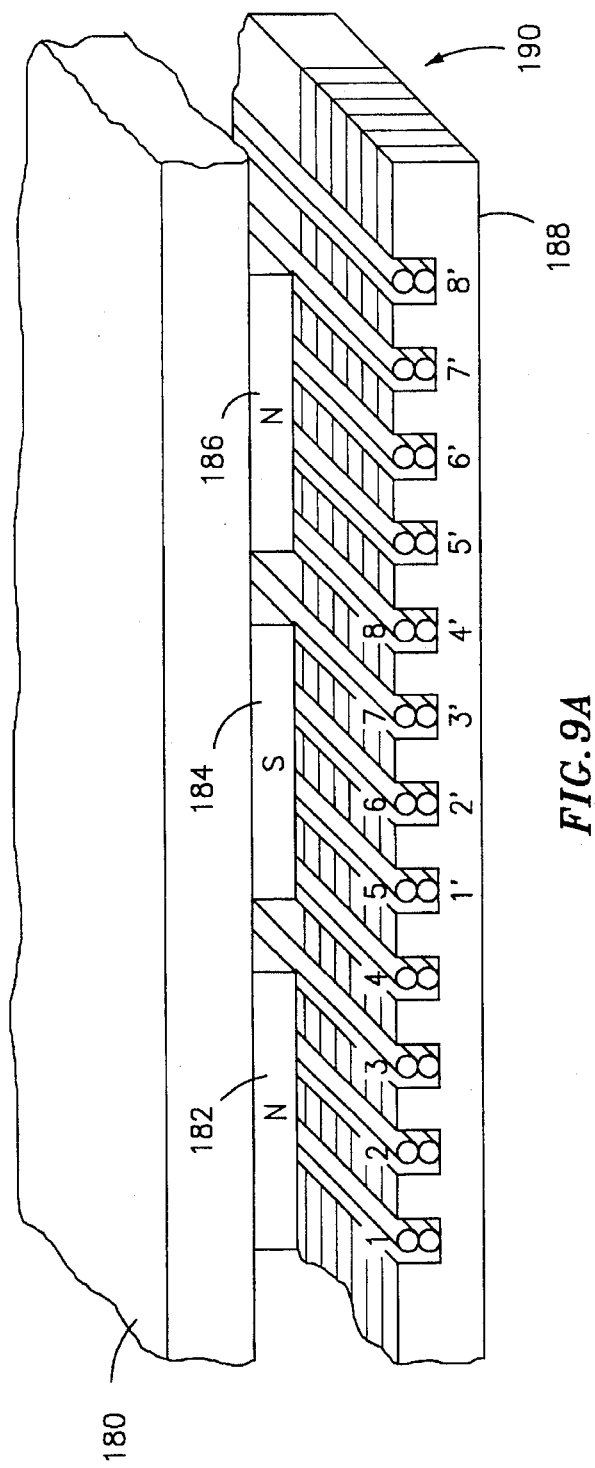
FIG. 9A shows a planar embodiment of the present invention.

It should be realized that the two cylindrical embodiments of the invention shown so far are not the only types of actuator that can be built according to the present invention. Such actuators can take many forms including other shapes such as rectangular rather than cylindrical and even planar. For example, FIG. 9A shows one-half of a planar embodiment that can be used on a double-sided basis, i.e., with three plates, or which can be used with only two plates, as shown, with bearings in between the two plates to keep them apart mechanically as shown in FIG. 9B. Such bearings could be ball beatings 179 held in slots in the plates and captured at the ends as shown in FIG. 9B, for example. The top and bottom halves are held together by magnetic attraction. The desired transverse motion between the plates is provided by slots 179a, 179b being made wider to a desired degree than the widths of corresponding ball bearing supports 179c, 179d made, e.g., of iron. An iron plate 180 has a plurality of magnets 182, 184, 186 attached thereto and alternating in polarity. Magnetic flux from the permanent magnets perpendicularly intersects a plurality of coils in slots as shown. The pole pitch, for example, can encompass four slots and be on the order of one hundred millimeters. The windings can be laid out with one side of the coil in slot 1 and the other side in slot 1', one side of a coil in slot 2 and the other in slot 2', another coil in slot 3 and 3', etc. These can be double layered coils as shown. The slots can be arranged in a laminated iron or steel plate 188 mounted on a base 189 of, e.g., iron with laminations 190 as shown better in FIG. 9C. This design uses long coils and short magnets, unlike the design of FIGS. 1 and 3 which use long magnets and short coils. As similarly explained previously, short coils and long magnets could be used in the embodiment of FIGS. 9A–D instead. FIG. 9D shows a top view with the top plate 180 having a linkable rod 200 attached thereto with the coil assembly 188 shown underneath and which is in turn attached to the elevator car 128 of FIG. 7, for example.

Figure 10:
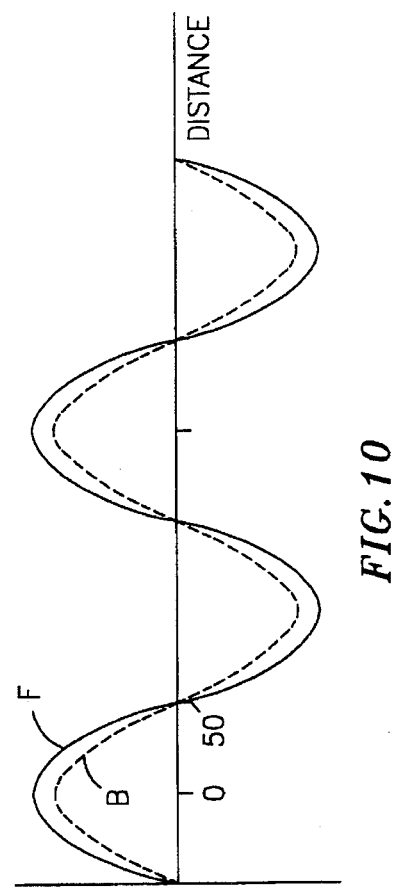
FIG. 10 shows magnetic flux density in the gap between the magnets and coils of FIG. 9A and a corresponding force curve corresponding thereto.

FIG. 10 shows a plot along a single abscissa (distance) of the magnetic flux density (B) and force (F) calculated for the design of FIGS. 9A–D with a pole pitch of one hundred millimeters. The required range is assumed to be similar to that shown in FIG. 1C and can result in forces similar to the embodiments shown previously.

Figure 11:
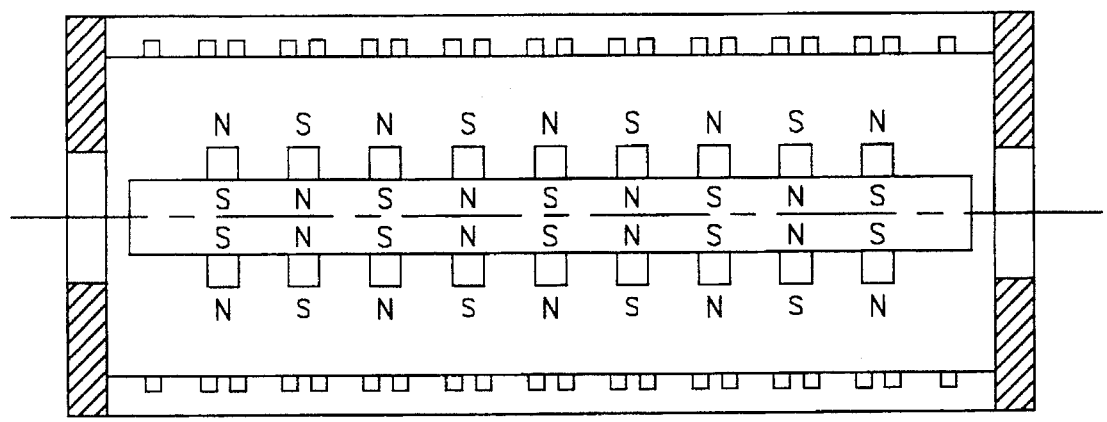
FIG. 11 shows an actuator similar to those shown in FIGS. 1A and 3 except having permanent magnets on the movable part and windings on the stationary part.

It should also be understood that the designs of FIGS. 1 and 2 could have the magnets on the movable rod and the coils on the stationary part as shown in FIG. 11, for example. The coils can be embedded in slots, as in FIGS. 9A–D, or can be on the surface, as desired.

Although the present invention has been described and discussed herein with respect to one or more embodiments, other arrangements or configurations can be implemented without departing from the spirit and scope hereof. Hence, the present invention is deemed limited only by the appended claims and the reasonable interpretation thereof.

What is claimed is:

1. An actuator for actuating an object connected thereto, comprising:

a stationary actuator part, said stationary actuator part having a selected axis;

a movable actuator part having an axis parallel to said selected axis of said stationary actuator part, said movable actuator part for being magnetically coupled to said stationary actuator part and for being movable along the axis parallel to said selected axis of said stationary actuator part;

means, mounted on said stationary and movable actuator parts, for providing said magnetic coupling for controlling movement of said movable actuator part along its axis;

said movable actuator part being also movable transversely with respect to said selected axis of said stationary actuator part to allow movement of the object; and said movable actuator part being a rod that includes a central section having a comparatively larger diameter and said rod having first and second end sections with comparatively smaller diameters.

2. An actuator for actuating an object connected thereto, comprising:

a stationary actuator part, said stationary actuator part having a selected axis;

a movable actuator part having an axis parallel to said selected axis of said stationary actuator part, said movable actuator part for being magnetically coupled to said stationary actuator part and for being movable along the axis parallel to said selected axis of said stationary actuator part;

means, mounted on said stationary and movable actuator parts, for providing said magnetic coupling for controlling movement of said movable actuator part along its axis;

said movable actuator part being also movable transversely with respect to said selected axis of said stationary actuator part to allow movement of the object; and said movable actuator part being provided with a plurality of coil sections that are surrounded by a corresponding plurality of permanent magnet sections mounted on said stationary actuator part.

3. The actuator as claimed in claim 2, wherein said plurality of coil sections includes adjacent coil sections that are formed from a single wire, and said corresponding plurality of permanent magnet sections include corresponding oppositely poled permanent magnet sections each associated with a respective adjacent coil section, each of said plurality of coil sections being disposed such that when a voltage is applied to the single wire current flows in opposite directions in said respective adjacent coil sections associated with corresponding oppositely poled ones of said permanent magnet sections, and such that current cutting flux from said corresponding oppositely poled permanent magnet sections causes a similarly directed force along the longitudinal axis of the movable actuator part in each of said plurality of coil sections.

4. An actuator for actuating an object connected thereto, comprising:

a stationary actuator part, said stationary actuator part having a selected axis;

a movable actuator part having an axis parallel to said selected axis of said stationary actuator part, said movable actuator part for being magnetically coupled to said stationary actuator part and for being movable along the axis parallel to said selected axis of said stationary actuator part;

means, mounted on said stationary and movable actuator parts, for providing said magnetic coupling for controlling movement of said movable actuator part along its axis;

said movable actuator part being also movable transversely with respect to said selected axis of said stationary actuator part to allow movement of the object; and said movable actuator part being provided with a plurality of permanent magnet sections that are surrounded by a corresponding plurality of windings mounted on said stationary actuator part.

5. An actuator for actuating an object connected thereto, comprising:

a stationary actuator part, said stationary actuator part having a selected axis;

a movable actuator part having an axis parallel to said selected axis of said stationary actuator part, said movable actuator part for being magnetically coupled to said stationary actuator part and for being movable along the axis parallel to said selected axis of said stationary actuator part;

means, mounted on said stationary and movable actuator parts, for providing said magnetic coupling for controlling movement of said movable actuator part along its axis;

said movable actuator part being also movable transversely with respect to said selected axis of said stationary actuator part to allow movement of the object; and said means for magnetically controlling longitudinal movement includes coils formed from a plurality of adjacent, separate wire coils wound in opposite directions with respect to correspondingly oppositely poled permanent magnet sections.

6. An actuator for actuating an object connected thereto, comprising:

a stationary actuator part, said stationary actuator part having a selected axis;

a movable actuator part having an axis parallel to said selected axis of said stationary actuator part, said movable actuator part for being magnetically coupled to said stationary actuator part and for being movable along the axis parallel to said selected axis of said stationary actuator part;

means, mounted on said stationary and movable actuator parts, for providing said magnetic coupling for controlling movement of said movable actuator part along its axis;

said movable actuator part being also movable transversely with respect to said selected axis of said stationary actuator part to allow movement of the object; and said stationary and movable actuator parts being single planar parts mechanically separated by bearings that permit both said longitudinal and transverse movement of said movable actuator part.

7. An actuator as claimed in claim 6, wherein one of said stationary and movable actuator parts is formed as two planar parts surrounding a single planar one of an other actuator part.

8. An actuator for actuating an object connected thereto, comprising:

a stationary actuator part, said stationary actuator part having a selected axis;

a movable actuator part having an axis parallel to said selected axis of said stationary actuator part, said movable actuator part for being magnetically coupled to said stationary actuator part and for being movable along the axis parallel to said selected axis of said stationary actuator part;

means, mounted on said stationary and movable actuator parts, for providing said magnetic coupling for controlling movement of said movable actuator part along its axis;

said movable actuator part being also movable transversely with respect to said selected axis of said stationary actuator part to allow movement of the object; and said stationary actuator part being formed in a housing, and said housing includes end slots, within which ends of said movable actuator part being movable both along its longitudinal axis and transversely to its longitudinal axis.

9. An actuator as claimed in claim 8, wherein said end slots are formed transversely to a longitudinal axis of a housing.

10. An actuator as claimed in claim 9, wherein said housing is adapted to be rigidly mounted to a structural member such that when a transverse force is applied by said object to said movable actuator part, said movable actuator part moves transversely within said slots.

11. An actuator for actuating an object connected thereto, comprising:

a stationary actuator part, said stationary actuator part having a selected axis;

a movable actuator part having an axis parallel to said selected axis of said stationary actuator part, said movable actuator part for being magnetically coupled to said stationary actuator part and for being movable along the axis parallel to said selected axis of said stationary actuator part;

means, mounted on said stationary and movable actuator parts, for providing said magnetic coupling for controlling movement of said movable actuator part along its axis;

said movable actuator part being also movable transversely with respect to said selected axis of said stationary actuator part to allow movement of the object; and said movable actuator part being bias mounted with respect to a structural member.

12. The actuator as claimed in claim 11, wherein said movable actuator part is bias mounted by means of at least one leaf spring mounted between said movable actuator part and said structural member such that when a transverse force is applied to said movable actuator part, said movable actuator part moves transversely against said at least one leaf spring.

13. An elevator vibration damping system, comprising:

first and second guide wheels, said guide wheels being affixed to an elevator car and being disposed on opposite sides of a guide rail or on opposite sides of said elevator car on opposite guide rails extending vertically within the hoistway of an elevator shaft, each guide wheel having a linkage member associated therewith;

an actuator, said actuator having a two ended actuator control rod adapted to move both longitudinally and transversely, said two ended actuator control rod having first and second end sections, each of said first and second end sections being connected to one of said linkage members associated with said first and second guide wheels;

means for sensing vibrations of said elevator car; and means for controlling said two ended actuator control rod of said actuator in accordance with vibrations sensed by said means for sensing vibrations of said elevator car.

* * * * *